Patented July 24, 1928.

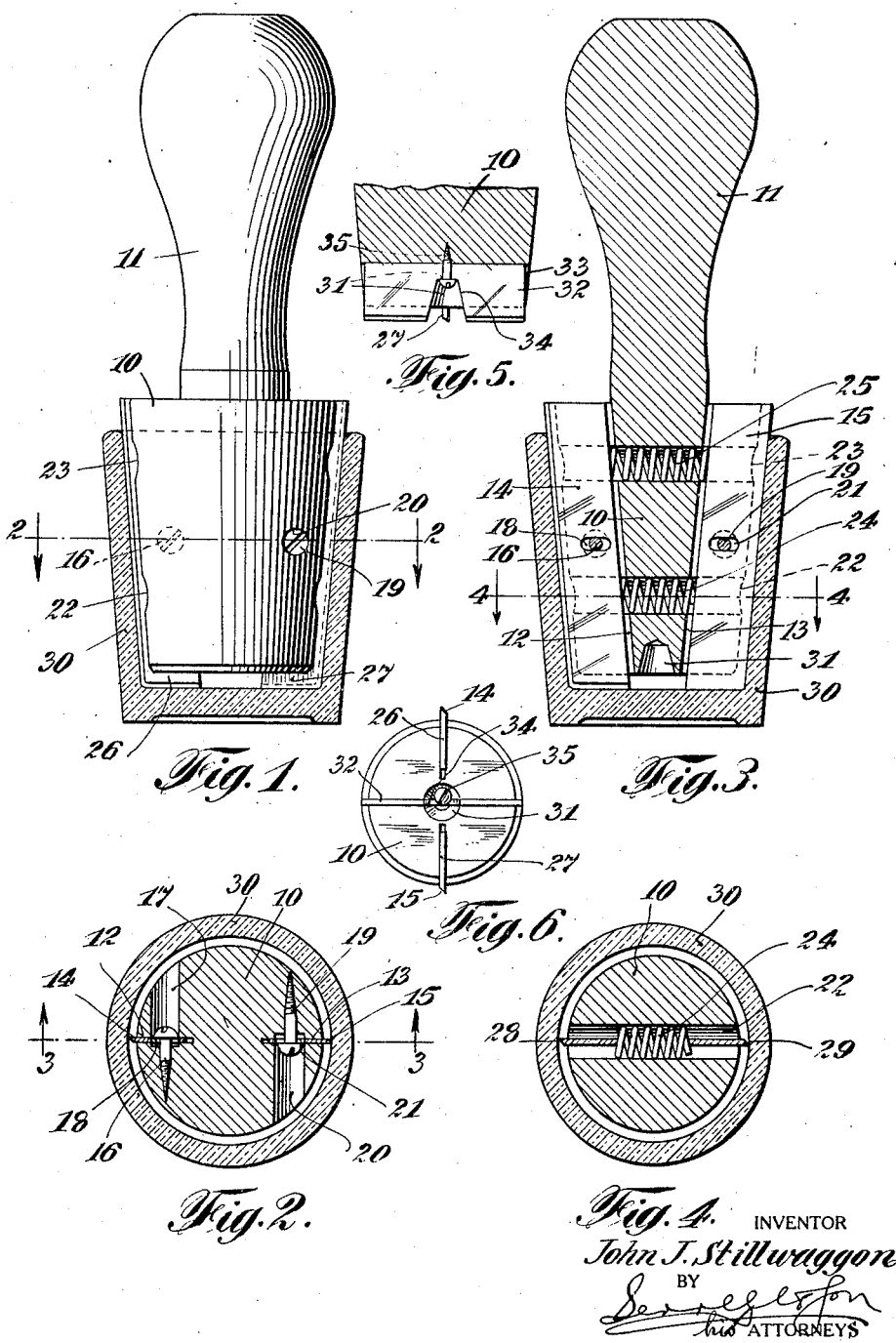

1,678,488

UNITED STATES PATENT OFFICE.

JOHN J. STILLWAGGON, OF JERSEY CITY, NEW JERSEY.

SCRAPER.

Application filed April 30, 1926. Serial No. 105,638.

My invention relates to a scraper or a tool particularly adapted for cleaning or scraping wax from the inner surface of a cup or jar used to contain the candles employed as sacristy lights. It will be understood, however, that while particularly adapted for this purpose the scraper made in accordance with my invention is not limited to this special use as it may be employed for scraping or cleaning wax or other substances from cups or jars or other vessels having an open end which is as large or larger than the inner portions thereof.

In carrying out the invention the tool made in accordance therewith preferably comprises a head having a handle and a blade or a plurality of blades set in the head so as to extend longitudinally thereof with the outer edge of the blade or edges of the blades normally and yieldingly maintained in position appreciably beyond the surface of the head. Furthermore, the head may be made in various forms to approximately fit the vessel which the tool is adapted to clean so that when inserted therein the extending portions of the blade or blades bear against the inner face of the vessel, and when the tool is turned in the vessel by means of the handle the blades engage the inner surface of the vessel to scrape and thus clean the wax or other substances therefrom, as will be hereinafter more particularly described.

In the drawing Figure 1 is an elevation and partial section illustrating a tool made in accordance with my invention.

Fig. 2 is a section on line 2—2, Fig. 1.

Fig. 3 is a longitudinal section of the tool taken on line 3—3, Fig. 2.

Fig. 4 is a transverse section taken on line 4—4, Fig. 3.

Fig. 5 is a partial sectional elevation showing another form of the invention, and Fig. 6 is an inverted plan of the same.

Referring to the drawing it will be seen that in carrying out the invention the tool made in accordance therewith comprises a head 10 with a handle 11 suitably connected therewith either integrally or otherwise. The head and the handle may be made of wood or any other suitable material. The head, furthermore, while illustrated as conical, may be cylindrical or of other configuration. As illustrated, in oppositely disposed positions running longitudinally thereof and extending radially therein the head is provided with grooves 12 and 13 adapted respectively to receive blades or scraper members 14, 15 which fit and lie within the said grooves with the outer edges and the edges at the end of the head normally projecting appreciable distances beyond the surface of the head.

The blade 14 is normally maintained in place in the groove 12 by means of a screw 16 which passes into a recess 17 and also through a transverse slot 18 in the blade. The width of the slot is substantially the same as the diameter of the screw, and the length of the slot transversely of the blade is appreciably longer than the diameter of the screw so that the blade pivots on the screw so as to rock thereon, and longitudinally may move radially in the recess to the extent of the length of the slot. Similarly the blade 15 is mounted in the groove 13 by means of a screw 19 which passes into a recess 20 and through a slot 21 in the blade 15 in a manner similar in all respect to that in which the blade 14 is mounted in the head as hereinbefore described.

The head 10 is also provided with transverse bores 22 and 23 which are suitably spaced, one lying on one side of the screw attachments as hereinbefore described, and the other on the opposite side thereof, these bores being parallel with the grooves 12 and 13. In the bore 22 there is a spring 24 and in the bore 23 there is a spring 25. These springs extend between and bear against the inner edges of the blades 14 and 15 so as to normally maintain them in such positions that the inner ends of the slots in the blades engage the screws and the edges of the blades extend appreciably beyond the surface of the head and are yieldingly maintained in this position by the springs 24 and 25.

The ends of the blades at the outer end of the head extend appreciably beyond the same as indicated at 26 and 27 and as is clearly illustrated in Figs. 1 and 3 of the drawing. The outer edges of the blades 14, 15 may be tapered as indicated at 28, 29 so as to provide more or less of a knife edge to facilitate the scraping operation.

As illustrated in the drawing, 30 indicates the cup or vessel adapted to receive a candle as employed for sacristy lights as hereinbefore stated, and for the purpose of illustration the tool is shown as designed to scrape the wax therefrom after the candle has burned itself out. Also as illustrated, the outer end of the head may be provided with a centrally disposed recess to receive a portion of the washer which is ordinarily employed in the base of sacristy candles, while the purpose of extending the outer ends of the blades as will be understood is to scrape and thus clean the surface at the bottom of the interior of the cup or other similar vessel.

It will be understood that the tool as illustrated and as hereinbefore described is adapted to scrape the inner walls of a vessel where the same are made tapering as shown in the drawing or are cylindrical, and also as hereinbefore stated, while particularly designed for the purposes stated, the invention is not limited to this special use as the tool may be employed for cleaning substances similar to wax, for example from the inner surface of any vessel into which the head of the tool may be inserted.

By reference to Figures 5 and 6 it will be seen that in addition to the longitudinally placed and yieldingly movable blades 14 and 15, I may also provide a transversely placed stationary blade at the outer end of the head to act in conjunction with the ends of the blades 14 and 15 in scraping the bottom surface of a cup or other receptacle. The transversely placed blade is indicated at 32 and this is set in a transversely placed recess 33 at the outer end of the head. This transverse blade 32 may be notched at 34 in such a way that the notch conforms generally to the outline of the recess 31 in the end of the head and the blade 32 may be suitably fixed in the head by means of a set screw 35 or otherwise. It will be understood of course, that the edge of the blade 34 extends beyond the end of the head and preferably to the same distance that the ends of the blades 14 and 15 extend beyond the end of the head.

I claim as my invention:

1. A scraper comprising a head having diametrically opposite grooves extending longitudinally in the face thereof, a blade mounted in each groove and each blade provided with a transverse elongated slot, pins extending transversely into the said head, there being a pin for each blade, which pin extends through the slot of the blade and is of a diameter substantially equal to the width of the slot whereby each blade is prevented from moving longitudinally of the head but is permitted to shift its position transversely of the head and also to swing on its pin, the said head being provided with transverse bores on opposite sides of the said pins, and yielding devices mounted in the said bores and bearing against the inner edges of the said blades to normally maintain the blades in positions in which the faces defining the inner ends of the slots in the blades engage with the said pins and the outer edges of the blades extend beyond the peripheral portions of the head.

2. A scraper comprising a head having a longitudinally disposed groove in the face thereof, a scraper blade mounted in said groove and provided with a transverse elongated slot, a pin extending transversely into the said head and through the slot in the said blade, the pin being of a diameter substantially equal to the width of the slot whereby the blade is prevented from moving longitudinally of the head but is shiftable to position transversely of the head and may also swing on its pin, the head being provided with transverse bores on opposite sides of the said pin, and springs mounted in the said bores and bearing against the edge of the said blade to normally maintain the same in a position in which the pin is at the inner end of the slot and the outer edge of the blade extends beyond the peripheral portion of the head.

Signed by me this 6th day of April, 1926.

JOHN J. STILLWAGGON.